(12) United States Patent
Benton et al.

(10) Patent No.: US 7,226,217 B1
(45) Date of Patent: Jun. 5, 2007

(54) TRANSCEIVER/FIBER OPTIC CONNECTOR ADAPTOR WITH PATCH CORD ID READING CAPABILITY

(75) Inventors: Mark Benton, Chicago, IL (US); Brian Herzing, Roselle, IL (US); Anthony Kowalkowski, Chicago, IL (US)

(73) Assignee: Stratos International, Inc., Chicago, IL (US)

( * ) Notice: Subject to any disclaimer, the term of this patent is extended or adjusted under 35 U.S.C. 154(b) by 14 days.

(21) Appl. No.: 11/282,371

(22) Filed: Nov. 18, 2005

(51) Int. Cl.
*G02B 6/36* (2006.01)
(52) U.S. Cl. .......................................... 385/89; 385/88
(58) Field of Classification Search ............... 385/89, 385/88
See application file for complete search history.

(56) References Cited

U.S. PATENT DOCUMENTS

| | | | |
|---|---|---|---|
| 4,427,879 A * | 1/1984 | Becher et al. | 250/215 |
| 4,972,050 A | 11/1990 | Hammond et al. | 174/251 |
| 5,419,717 A * | 5/1995 | Abendschein et al. | 439/577 |
| 5,473,715 A | 12/1995 | Schofield et al. | 385/53 |
| 5,481,634 A | 1/1996 | Anderson et al. | 385/76 |
| 5,579,425 A * | 11/1996 | Lampert et al. | 385/59 |
| 5,910,776 A | 6/1999 | Black | 340/825.35 |
| 6,361,357 B1 * | 3/2002 | Stillwell et al. | 439/490 |
| 6,543,941 B1 * | 4/2003 | Lampert | 385/58 |
| 6,793,408 B2 * | 9/2004 | Levy et al. | 385/88 |
| 6,912,333 B2 * | 6/2005 | Mikawa et al. | 385/14 |
| 6,932,517 B2 * | 8/2005 | Swayze et al. | 385/88 |
| 7,062,116 B2 * | 6/2006 | Ouchi | 385/14 |
| 7,080,945 B2 * | 7/2006 | Colombo et al. | 385/92 |
| 7,123,810 B2 | 10/2006 | Parrish | 385/139 |
| 2002/0003931 A1 * | 1/2002 | Cairns et al. | 385/56 |
| 2002/0102066 A1 * | 8/2002 | Nishita | 385/75 |
| 2005/0069262 A1 * | 3/2005 | Roth et al. | 385/55 |
| 2005/0224585 A1 * | 10/2005 | Durrant et al. | 235/492 |
| 2005/0231325 A1 * | 10/2005 | Durrant et al. | 340/10.1 |
| 2006/0006313 A1 * | 1/2006 | Sherrer et al. | 250/216 |
| 2006/0182397 A1 * | 8/2006 | Benner et al. | 385/89 |

* cited by examiner

*Primary Examiner*—Ellen E. Kim
(74) *Attorney, Agent, or Firm*—Karl D. Kovach

(57) ABSTRACT

The device includes a first optical connector, a second optical connector, a flexible substrate, a first electrical connector, a second electrical connector, a memory chip, and a clip. The first electrical connector is attached to the flexible substrate. The second electrical connector is attached to the flexible substrate. The memory chip is attached to the flexible substrate. A clip retains the first optical connector and the second optical connector adjacent to the flexible substrate.

12 Claims, 3 Drawing Sheets

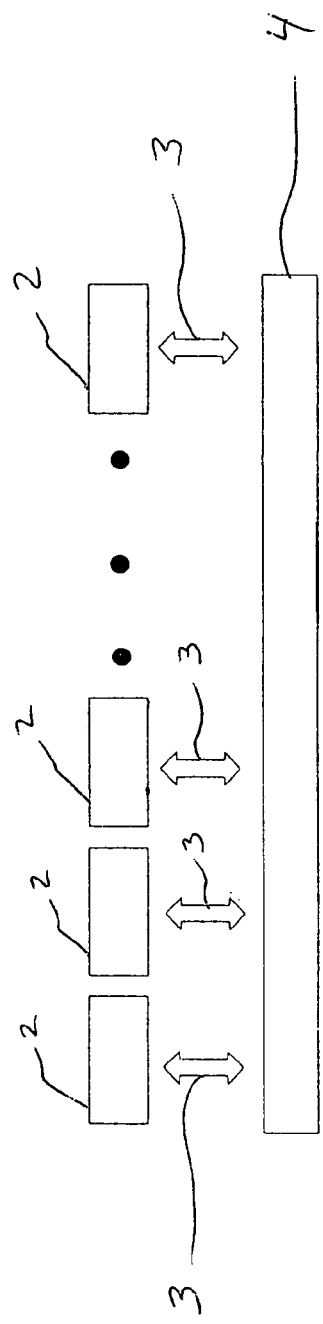
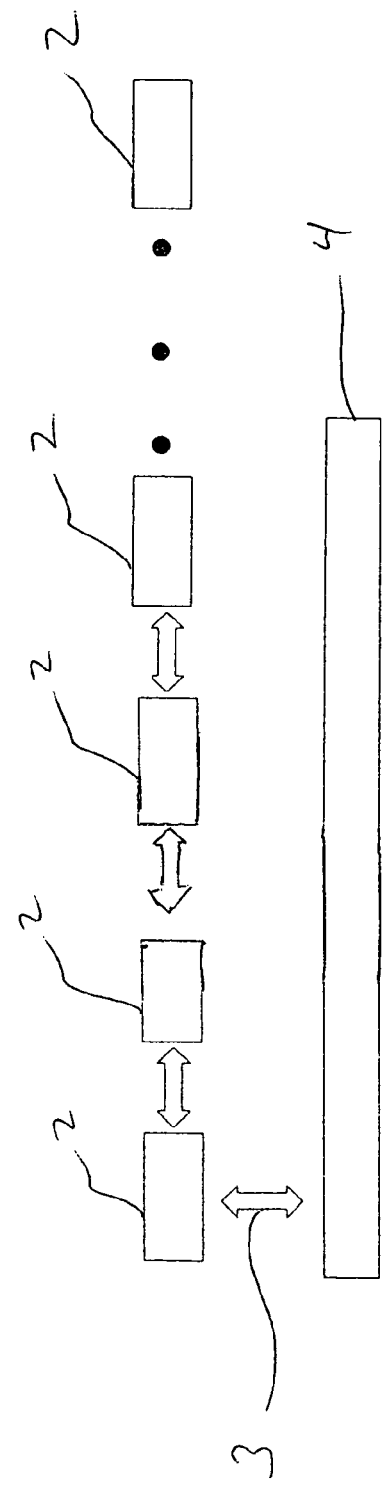

TRANSCEIVER/FIBER OPTIC CONNECTOR ADAPTOR WITH PATCH CORD ID READING CAPABILITY

BACKGROUND OF THE INVENTION

1. Field of the Invention

The present invention pertains to hybrid connectors having optical and electrical connector portions. The invention more particularly concerns the management of a component or body, such as a hybrid connector, including the storage and updating of information related to events during the operational life of the component.

2. Discussion of the Background

Hybrid connectors are known the art. U.S. Pat. No. 5,473,715 discloses a hybrid connector having an optical connector portion conforming to the SC fiber optic connector standard and an electrical connector portion electrically associated with a small outline transistor. The small outline transistor contains an enhanced silicon serial number so as to uniquely identify the hybrid connector. The enhanced silicon serial number is placed on the small outline transistor by the manufacturer of the small outline transistor. The hybrid connector, once connected to a patch panel, facilitates remote system connectivity management and verification since the host device or patch panel reads the unique enhanced silicon serial number off of the small outline transistor and correlates the serial number to a specific hybrid connector via a table look-up. The end user or operator of the hybrid connector can only read what was deposited by the manufacturer in the memory of the small outline transistor. U.S. Pat. No. 5,473,715 is hereby incorporated herein by reference.

Experience has shown that a fiber optic cable can be inadvertently detached from the host device, or that the optical fiber within the fiber optic cable breaks and the fiber optic cable no longer transmits light energy to the host device. In such instances, a worker must go and look at the panel of the host device and determine which cable is no longer transmitting light signals to the host device either because the optical fiber is broken or the fiber optic cable is detached from the host device. When two or more fiber optic cables are malfunctioning, the worker's job becomes very burdensome and time consuming since there are hundreds of fiber optic cables to examine. Furthermore, a device or person is not receiving information conveyed by the malfunctioning fiber optic cable. Thus, organization of the cables, including the fiber optic cables and the copper based cables, in the vicinity of the panel is of great interest to the operators of the host devices.

Furthermore, in order to recoup the cost of the broken fiber optic cable, the operator of the system must look through paper work to verify if the broken fiber optic cable is still under warranty. Also, as part of the warranty process, the operator of the system may need to verify that the fiber optic cable was not used outside of its design parameters. Thus, the management of the fiber based system can be facilitated by being able to quickly find warranty documents related to components in the fiber based system, and to verify the use of the components.

SUMMARY OF THE INVENTION

It is an object of the invention to provide a device which facilitates the identification of a specific connector or cable and to be able to retrieve information related to the life cycle of that specific connector or cable.

It is another object of the invention to provide a device which facilitates the identification of a specific connector or cable and to be able to retrieve warranty information related to that specific connector or cable.

It is yet another object of the invention to provide a device which facilitates the identification of a specific connector or cable and to be able to retrieve information related to the number of insertion cycles of the specific connector or cable.

It is still yet another object of the invention to provide a device which facilitates the identification of a specific connector or cable and to be able to retrieve information related to the number of rework instances.

In one form of the invention the device includes a first optical connector, a second optical connector, a flexible substrate, a first electrical connector, a second electrical connector, a memory chip, and a clip. The first optical connector includes a first single fiber ferrule. The second optical connector includes a second single fiber ferrule. The first electrical connector is attached to the flexible substrate. The first electrical connector includes a first contact and a second contact. The second electrical connector is attached to the flexible substrate. The memory chip is attached to the flexible substrate. The second electrical connector includes a third contact and a fourth contact. A clip retains the first optical connector and the second optical connector adjacent to the flexible substrate.

In another form of the invention the device includes a first fiber optic connector, a second fiber optic connector, a memory chip, a first electrical connector, and a second electrical connector. The first fiber optic connector includes a single fiber ferrule. The second fiber optic connector is a receptacle. The first electrical connector is attached to the first fiber optic connector. The first electrical connector includes a third contact and a fourth contact. The second electrical connector is attached to the second fiber optic connector. The second electrical connector includes a first contact and a second contact, and the first contact and second contact of the second electrical connector are in the receptacle of the second fiber optic connector. The memory chip electrically associated with the first electrical connector. The memory chip contains a unique identifying code, and has a non-volatile memory so that information can be read from and written to the memory chip. The second fiber optic connector has a shape complementary to a shape of the first fiber optic connector. The second electrical connector has a shape complementary to a shape of the first electrical connector. When the first fiber optic connector is plugged into the second fiber optic connector, the first fiber optic connector is in optical communication with the second fiber optic connector, the first contact and the second contact of the second electrical connector are in electrical communication with the third contact and the fourth contact of the first electrical connector, and the second electrical connector is electrically associated with the memory chip.

In still yet another form of the invention the device includes a housing, an optical connector, a first light emitting diode, a second light emitting diode, a first optical sub-assembly, and a second optical sub-assembly. The optical connector is attached to the housing. The optical connector includes a first receptacle and a second receptacle. The first receptacle accommodates only a first single fiber ferrule, and the second receptacle accommodates only a second single fiber ferrule. The first receptacle of the optical connector includes a first electrical contact and a second electrical contact. The first and second light emitting diodes are attached to the optical connector and provide visual indications to an observer. The second receptacle of the optical connector includes a third electrical contact and a fourth electrical contact. The first optical sub-assembly is in optical communication with the first receptacle of the optical connector. The second optical sub-assembly is in optical communication with the second receptacle of the optical connector.

Thus, the invention achieves the objectives set forth above. The invention provides a device which is able, or helps, to read or write useful information associated with a memory chip of a body or component, such as, for example, a fiber optic connector. Useful information includes, but is not limited to, warranty information, insertion cycle history, rework information, and upgrade information. Therefore, the operator of the system does not spend time looking for paper documents to verify that the warranty exists and is still valid, and does not spend time looking for paper work associated with the past history of insertions and rework of the body having the memory chip, since all of this information is available by reading the memory chip of the body.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 is an electrical block diagram of a plurality of couplers of FIG. 2 electrically connected, in parallel, to an intelligent patch panel controller via flying leads;

FIG. 4 is an electrical block diagram of a plurality of couplers of FIG. 2 electrically connected, in series, to an intelligent patch panel controller via a flying lead;

DETAILED DESCRIPTION OF THE PRESENTLY PREFERRED EMBODIMENT

Figure 1:
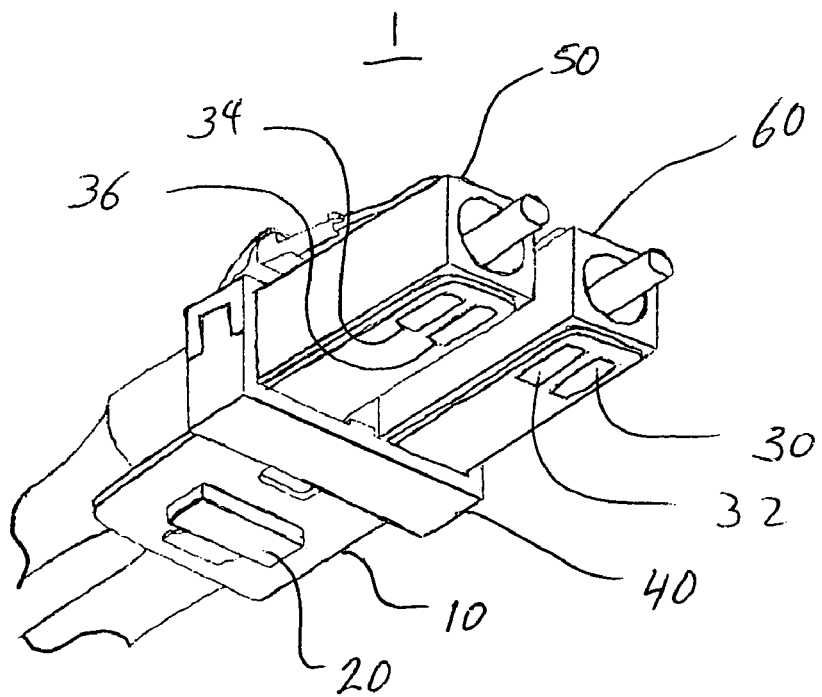
FIG. 1 is a perspective view of a hybrid connector having both electrical and optical connector portions, and a memory chip.

Referring now to the drawings, wherein like reference numerals designate identical or corresponding parts throughout the several views, and more particularly to FIGS. 1-6 thereof, embodiments of the present invention are displayed therein.

A first embodiment of the invention is shown in FIG. 1. FIG. 1 is a perspective view of a hybrid connector or device 1 having both optical and electrical connector portions 50, 60, and 30, 32, 34, 36, respectively, and a memory chip 20. A flexible substrate 10, made of a polymer material, has conductive traces laid down on it so as to connect to the memory chip 20. The first electrical connector includes contacts 34, 36. The second electrical connector includes contacts 30, 32. The pairs of contacts 34, 36 and 30, 32 are electrically associated with the memory chip 20. The flexible substrate 10 can be mounted to the fiber optic connectors 50, 60 with an adhesive material. Additionally, or instead of the adhesive material, a clip 40 can be used to retain the first fiber optic connector 50 and the second fiber optic connector 60 adjacent to the flexible substrate 10. The use of the flexible substrate 10 allows existing fiber optic connectors to be retrofitted. U.S. Pat. No. 4,972,050 discloses a method of constructing a substrate where the substrate includes conductive paths. U.S. Pat. No. 4,972,050 is hereby incorporated herein by reference.

The memory chip 20 contains a unique identifying code. The unique identifying code can consist of numerals, letters, or alphanumeric characters, which are machine readable. The memory chip 20 has a non-volatile memory so that information can be read from the memory chip 20 or written to the memory chip 20. The information or data stored on the memory chip 20 can be secured by being encrypted or coded with a specific key or keys to encode or decode the data. The memory chip 20 conforms to the inter-integrated circuit standard (I2C or I1C) so that the memory chip 20 can easily communicate with other components such as a host device that also utilizes the I2C standard.

The first optical connector 50 and the second optical connector 60 generally conform to the LC standard, however, the fiber optic connectors can also be constructed to conform to any other standard such as SC, and MU. The ferrule of each fiber optic connector is a single fiber ferrule, however multi-fiber ferrules and connectors can also be employed. Additionally, the fiber optic connector can be of its own unique design. Furthermore, each of the optical fibers terminated at the respective ferrules of the respective first and second fiber optic connectors 50, 60 can be any one of a single mode fiber, a multimode fiber, a polarization maintaining fiber, or any other type of optical fiber. U.S. Pat. No. 5,481,634 discloses an LC style connector. U.S. Pat. No. 5,481,634 is hereby incorporated herein by reference.

Figure 2:
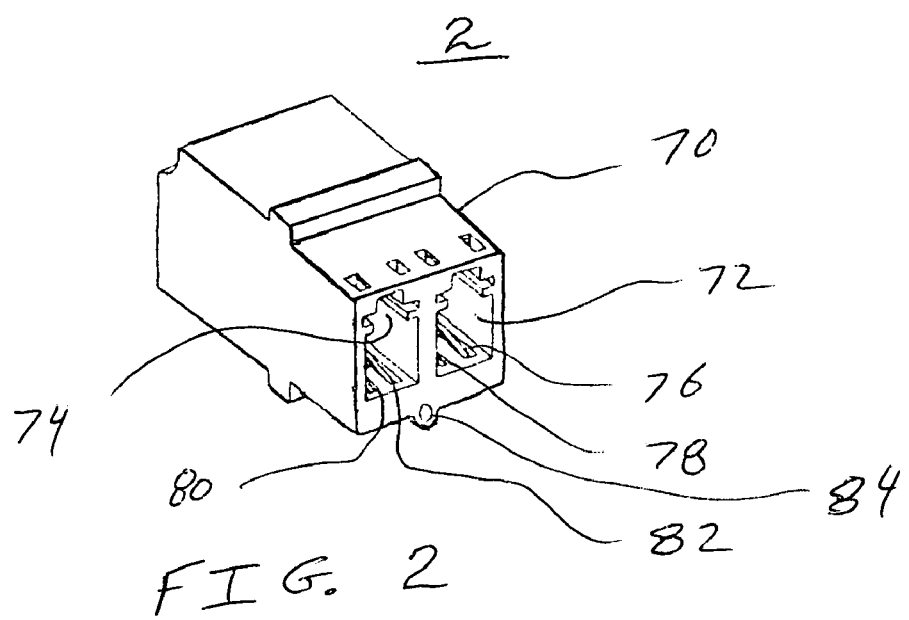
FIG. 2 is a perspective view of another hybrid connector or coupler which is complimentary to the hybrid connector of FIG. 1.

A second embodiment of the invention is the combination of the hybrid connector 1, as shown in FIG. 1, and the adaptor 2, as shown in FIG. 2. FIG. 2 is a perspective view of another hybrid connector, or adapter, or coupler 2 having both optical and electrical connector portions that are complimentary to the optical and electrical connector portions of the hybrid connector 1 of FIG. 1. The adaptor 2 can be a stand alone device or it can be part of a patch panel where many of the adaptors are present adjacent to one another. Certain features of the adaptor, such as its optical interface, are similar to those features found on a transceiver, as is discussed later. The adaptor 2 includes a housing 70, a first optical connector 72 and a second optical connector 74. The first optical connector 72 is an LC standard receptacle that is designed to accept a fiber optic connector as shown in FIG. 1. The second optical connector 74 is an LC standard receptacle. The first optical connector 72 contains contacts 76, 78 which form the first electrical connector of the adaptor 2. The second optical connector 74 contains contacts 80, 82 which form the second electrical connector of the adaptor 2. A light emitting diode 84 is electrically associated with the contacts 76, 78 and 80, 82.

When the hybrid connector 1 of FIG. 1 is plugged into the hybrid adaptor 2 of FIG. 2, the first fiber optic connector 50 of the hybrid connector 1 is in optical communication with the first fiber optic connector 72 of the hybrid adapter 2, and the second fiber optic connector 60 of the hybrid connector 1 is in optical communication with the second fiber optic connector 74 of the hybrid adapter 2. Also, the contacts 34, 36 of the first electrical connector of the hybrid connector 1 contact and electrically communicate with the contacts 76, 78 of the first electrical connector of the hybrid adapter 2, and the contacts 30, 32 of the second electrical connector of the hybrid connector 1 contact and electrically communicate with the contacts 80, 82 of the second electrical connector of the hybrid adapter 2. Therefore, the memory chip 20 is in electrical communication with contacts 76, 78 of the first electrical connector of the hybrid adapter 2, and contacts 80, 82 of the second electrical connector of the hybrid adapter 2. When the contacts 34, 36 and 76, 78, and 30, 32 and 80, 82 have mated then the circuit is closed and the light emitting diode 84 is activated so as to show that the hybrid connector 1 has been successfully plugged into the hybrid adapter 2.

FIG. 3 is an electrical block diagram of a plurality of couplers or adapters 2 assembled in a patch panel. Each of the adapters 2 is electrically connected, in parallel, to an intelligent patch panel controller 4 by respective flying leads 3 so as to electrically associate each of the adapters 2 with the intelligent patch panel controller 4. However, this arrangement involves a lot of wiring to the intelligent patch panel controller 4.

In order to reduce the amount of wiring to the intelligent patch panel controller, the electrical block diagram of FIG. 4 is introduced. FIG. 4 is an electrical block diagram of a plurality of couplers or adapters 2 assembled in a patch panel. Each of the adapters 2 is electrically connected, in series, to an intelligent patch panel controller 4 by respective flying leads 3 so as to electrically associate each of the adapters 2 with the intelligent patch panel controller 4. Since the adapters 2 are connected in series, the wiring effort is pushed outward towards the panel of the patch panel.

In practice, for example, when the hybrid connector 1 is plugged into the hybrid adapter 2 of a patch panel as shown in FIG. 3 or FIG. 4, the intelligent patch panel controller 4 is able to gain access to the memory of memory chip 20 of the hybrid connector 1. The intelligent patch panel controller 4 reads the unique identifying code stored on the memory chip 20. The intelligent patch panel controller 4 then correlates the unique identifying code to a specific hybrid connector 1 and to a specific location on the patch panel. The intelligent patch panel controller 4 can also read any other information stored in the memory of memory chip 20. The intelligent patch panel controller 4 can also write information or data to the memory of the memory chip 20 for storage.

The operator or user of the host device having the patch panel can command the intelligent patch panel controller 4 to increment by one a data storage location in the memory chip 20 each time the hybrid connector 1 is attached to the hybrid adapter 2. Also, the operator of the intelligent patch panel controller 4 can command it to write other information to the memory of the memory chip 20 as is described below.

Information stored on the memory chip 20 includes information related to the life cycle of the connector from the inception of the connector until the time the connector is no longer used. Examples of information which can be stored on the memory chip 20 include the following information: the number of insertion cycles of the hybrid connector 1 with the hybrid adapter 2; the number of rework instances of the hybrid connector 1; the number of warranty rework instances of the hybrid connector 1; the number of general refurbishment instances of the hybrid connector 1; the number of upgrade history instances of the hybrid connector 1; the length of the fiber optic cable to which the memory chip 20 is attached; the date of purchase of the fiber optic cable to which the memory chip 20 is attached; the type or style of fiber optic connector to which the memory chip 20 is attached; the type of warranty associated with the fiber optic cable to which the memory chip 20 is attached; the type, style, or grade of optic fiber housed within the fiber optic cable to which the memory chip 20 is attached; and/or a unique identification number or serialization number or code which uniquely identifies a specific memory chip 20.

Additionally, the name of the assembler or operator performing the rework, warranty work, or upgrade work can be stored in the memory chip 20. Furthermore, during the assembly or build of the connector, the identification and source of component parts used to construct the connector can be stored on the memory chip 20 along with the identification of the assemblers and operators involved in the build of the device. Procedures used during the build can also be stored in the memory chip 20. Once the connector is built, the connector can be tested for compliance and operational characteristics, such as attenuation. The details of the testing procedures, operator, and test results can be stored in the memory chip 20. The dates of performance of the build, testing, rework, refurbishment work, warranty work, and upgrade work can be stored in the memory chip 20 along with any other significant dates during the life history of the connector.

Figure 5:
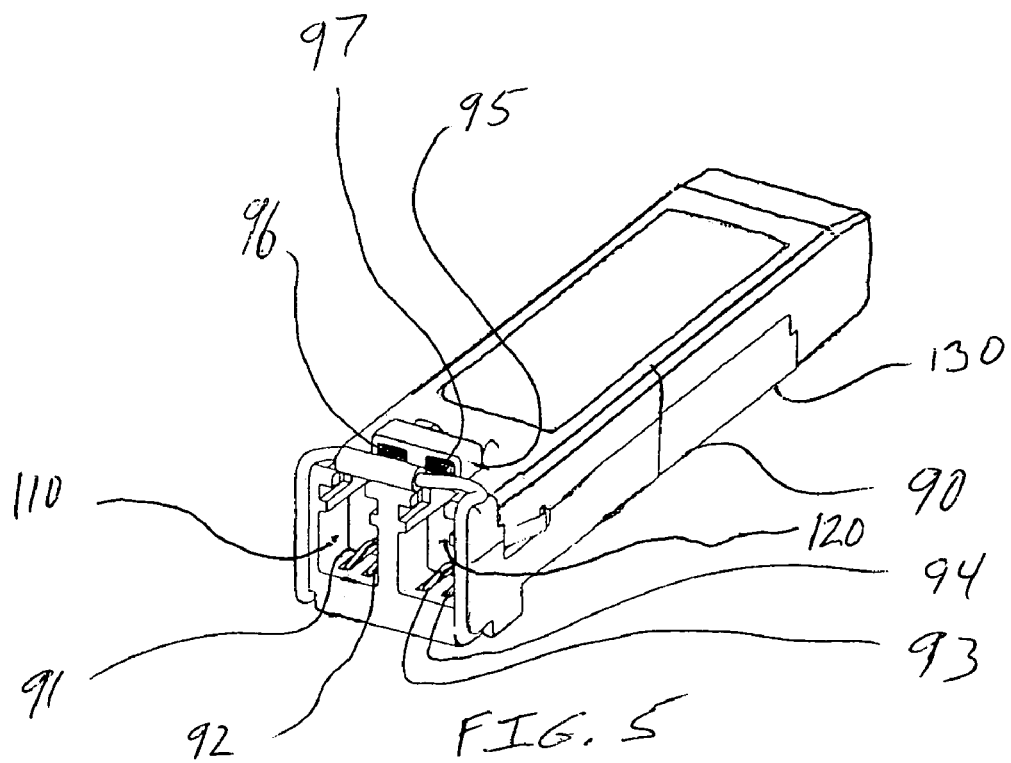
FIG. 5 is a perspective view of a transceiver having optical and electrical connectors which are complimentary to the configuration of the hybrid connector of FIG. 1.

A third embodiment of the invention is shown in FIG. 5 which incorporates the adaptation of the contacts into the optical connector of a transceiver so as to make the connector a hybrid connector which enables the hybrid connector of the transceiver is compatible with the hybrid connector 1 of FIG. 1. FIG. 5 is perspective view of a transceiver 90 having a first optical connector 110, a second optical connector 120, contacts 91, 92 which form the first electrical connector, and contacts 93, 94 which form the second electrical connector. As is common to optoelectronic devices such as a transceiver, the device includes a first optical sub-assembly, a second optical sub-assembly, signal conditioning electronics, and a housing 130. The transceiver 90 includes a light emitting diode housing 95 which includes a first light emitting diode 96 and a second light emitting diode 97.

The shape and function of the first optical connector, the second optical connector, the first electrical connector, and the second electrical connector of the transceiver 90 are the same or similar to the shape and function of the optical receptacles and electrical connectors associated with adapter 2 of FIG. 2. The light emitting diodes 95, 96 of the transceiver are useful since, when the transceiver 90 is plugged into an adapter 2, the light emitting diode 84 of the adapter 2 may not be visible. So, similar to the function and purpose of the light emitting diode 84 of the adapter 2, the light emitting diodes 95, 96 function and exist for the same reason: so that an observer can easily note that the hybrid connector 1 has been successfully plugged into the transceiver 90.

In another variation of the third embodiment, the transceiver 90 includes a memory chip and circuitry that is compatible with the I2C standard. When a hybrid connector 10 is plugged into the transceiver 10, the transceiver 10 can read information off of the memory chip 20 of the hybrid connector 10 and store that information in the memory chip of the transceiver 90. The transceiver 90 then forwards the information to the host device. The memory chip of the transceiver 90 then has a log of all of the hybrid connectors that have been plugged to the transceiver 90.

Figure 6:
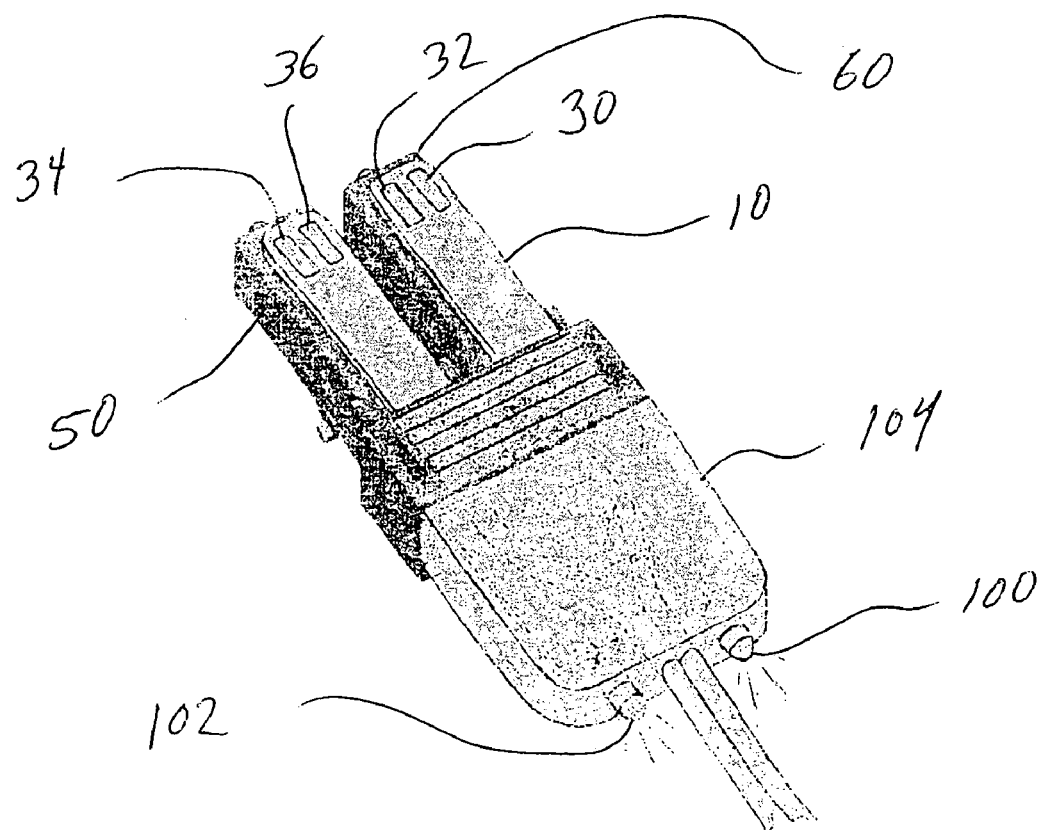
FIG. 6 is a perspective view of the hybrid connector of FIG. 1 having light emitting diodes.

A variation on the first embodiment of the invention is shown in FIG. 6. FIG. 6 is a perspective view of the hybrid connector of FIG. 1 having light emitting diodes. The hybrid connector 10 includes a housing 104 which houses a first light emitting diode 100, and a second light emitting diode 102. The light emitting diodes 100, 102 are activated once the hybrid connector 10 has been successfully plugged into an adapter 2 or a transceiver 90 so as to provide a better visual indication that engagement of the components is complete.

Obviously, numerous modifications and variations of the present invention are possible in light of the above teachings. It is therefore to be understood that within the scope of appended claims, the invention may be practiced otherwise than as specifically described herein.

The invention claimed is:

1. A device comprising:
    a first optical connector having a first single fiber ferrule;
    a second optical connector having a second single fiber ferrule;
    a flexible substrate;
    a first electrical connector attached to the flexible substrate, the first electrical connector having a first contact and a second contact;
    a second electrical connector attached to the flexible substrate, the second electrical connector having a third contact and a fourth contact;
    a memory chip attached to the flexible substrate;
    a clip for retaining the first optical connector and the second optical connector adjacent to the flexible substrate.

2. A device according to claim 1 wherein the first fiber optic connector conforms to the LC fiber optic connector standard, and wherein the second fiber optic connector conforms to the LC fiber optic connector standard.

3. A device according to claim 2 wherein an adhesive attaches the flexible substrate to the first optical connector and to the second optical connector.

4. A device according to claim 3, further comprising a first light emitting diode for providing a first visual indication to an observer.

5. A device according to claim 4, further comprising a second light emitting diode for providing a second visual indication to the observer, and wherein the memory chip includes a unique identifying code.

6. A device comprising:
    a first fiber optic connector having a single fiber ferrule;
    a first electrical connector attached to the first fiber optic connector, and the first electrical connector having a third contact and a fourth contact;
    a memory chip electrically associated with the first electrical connector, the memory chip containing a unique identifying code, the memory chip having a non-volatile memory so that information can be read from the memory chip and written to the memory chip;
    a second fiber optic connector having a shape complementary to a shape of the first fiber optic connector, the second fiber optic connector is a duplex receptacle; and
    a second electrical connector having a shape complementary to a shape of the first electrical connector, the second electrical connector attached to the second fiber optic connector, and the second electrical connector having a first contact and a second contact, and wherein the first contact and the second contact of the second electrical connector are in the receptacle of the second fiber optic connector, and wherein,
    when the first fiber optic connector is plugged into the second fiber optic connector, the first fiber optic connector is in optical communication with the second fiber optic connector the first contact and the second contact of the second electrical connector are in electrical communication with the third contact and the fourth contact of the first electrical connector, and the second electrical connector is electrically associated with the memory chip.

7. A device according to claim 6 wherein the first fiber optic connector conforms to the LC fiber optic connector standard, and wherein the second fiber optic connector conforms to the LC fiber optic connector standard.

8. A device according to claim 6 wherein the second fiber optic connector includes a light emitting diode for providing a first visual indication to an observer.

9. A device according to claim 8 wherein the first optical connector includes a substantially planar side.

10. A device comprising:
    a housing a memory chip mounted in said housing, and the memory chip containing a unique identifying code;
    an optical connector attached to the housing, the optical connector including a first receptacle and a second receptacle, and wherein the first receptacle of the optical connector includes a first electrical contact and a second electrical contact, and wherein the second receptacle of the optical connector includes a third electrical contact and a fourth electrical contact, the first receptacle accommodates only a first single fiber ferrule, and the second receptacle accommodates only a second single fiber ferrule;
    a first light emitting diode attached to the optical connector for providing a first visual indication to an observer;
    a second light emitting diode attached to the optical connector for providing a second visual indication to the observer;
    a first optical sub-assembly mounted to the housing and being in optical communication with the first receptacle of the optical connector; and
    a second optical sub-assembly mounted to the housing and being in optical communication with the second receptacle of the optical connector.

11. A device according to claim 10 wherein the first receptacle of the fiber optic connector conforms to the LC fiber optic connector standard, and wherein the second receptacle of the fiber optic connector conforms to the LC fiber optic connector standard.

12. A transceiver comprising:
    a housing;
    an electrical connector attached to the housing;
    an optical connector attached to the housing, the optical connector including a first receptacle and a second receptacle, and wherein the first receptacle of the optical connector includes a first electrical contact and a second electrical contact, and wherein the second receptacle of the optical connector includes a third electrical contact and a fourth electrical contact, the first receptacle accommodates a first single fiber ferrule, and the second receptacle accommodates a second single fiber ferrule;
    a first optical sub-assembly mounted to the housing and being in optical communication with the first receptacle of the optical connector;
    a second optical sub-assembly mounted to the housing and being in optical communication with the second receptacle of the optical connector;
    a memory chip having a unique identifying code; and
    a printed circuit board mounted in the housing, the printed circuit board having electric signal conditioning components mounted thereon, and wherein the electric signal conditioning components electrically associate the first optical sub-assembly and the second optical sub-assembly to the electrical connector, and wherein the electric signal conditioning components electrically associate the first electrical contact, the second electrical contact, the third electrical contact, and the fourth electrical contact with the memory chip, and wherein the electrical signal conditioning components and the memory chip are compatible with the I2C standard.

* * * * *